United States Patent
Ukawa

(10) Patent No.: US 7,142,488 B2
(45) Date of Patent: Nov. 28, 2006

(54) OPTICAL DISK RECORDING/REPRODUCING APPARATUS

(75) Inventor: Yoshiaki Ukawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 470 days.

(21) Appl. No.: 10/449,601

(22) Filed: Jun. 2, 2003

(65) Prior Publication Data

US 2003/0231564 A1 Dec. 18, 2003

(30) Foreign Application Priority Data

Jun. 17, 2002 (JP) ............................ P2002-176066

(51) Int. Cl.
*G11B 7/095* (2006.01)

(52) U.S. Cl. .................................. 369/44.32

(58) Field of Classification Search ...................... None
See application file for complete search history.

(56) References Cited

U.S. PATENT DOCUMENTS 6,504,799 B1 * 1/2003 Yamashita et al. ........ 369/44.11

FOREIGN PATENT DOCUMENTS

| JP | 7-153210 | 6/1995 |
|----|----------|--------|
| JP | 11-7639 | 1/1999 |
| JP | 2000-132855 | 5/2000 |
| JP | 2001-176095 | 6/2001 |
| JP | 2003-109232 | 4/2003 |

* cited by examiner

*Primary Examiner*—William Korzuch
*Assistant Examiner*—Joseph Haley
(74) *Attorney, Agent, or Firm*—Morgan, Lewis & Bockius LLP

(57) ABSTRACT

A controller configures a balance position of a tracking error signal at a point at which an error rate indicates a minimum value while the balance position of the tracking error signal from an optical pickup is shifted from the center in reproducing the optical disk. Therefore, even when a pit on the track of the optical disk is asymmetrical with respect to the center, the error rate in reproducing the optical disk is reduced and the precision of the reproducing signal is enhanced.

4 Claims, 4 Drawing Sheets

OPTICAL DISK RECORDING/REPRODUCING APPARATUS

BACKGROUND OF THE INVENTION

1. Field of the Invention

The present invention relates to an optical disk recording/reproducing apparatus for recording or reproducing information on or from an optical disk, and more particularly, to a tracking control of an optical pickup over an optical disk.

2. Description of the Related Art

Conventionally, an optical disk recording/reproducing apparatus performs a tracking control of an optical pickup over tracks of an optical disk, employing a tracking error signal acquired from the optical disk, when driving the optical disk during a recording or reproducing process.

As conventional arts for such tracking control, an information reproducing apparatus is described in JP-A-7-153210, and a tracking control device is described in JP-A-11-007639. In the information reproducing apparatus as described in JP-A-7-153210, a microcomputer takes in a DC voltage corresponding to a PWM output to control an outgoing beam of an optical pickup via an A/D converter, measures a conversion error of the A/D converter, corrects a converted value from the A/D converter with the conversion error, and adjusts a tracking error signal based on this correction value, before adjusting the balance position of a tracking error signal acquired from the optical disk.

The tracking control device as described in JP-A-11-007639 configures the driving parameters according to a type of the optical disk, turns off a tracking servo and excites an output beam of an optical pickup in a radial direction of the optical disk, integrates the tracking error signal by multiple times within a predetermined period of time and in a predetermined area to calculate a mean value, controls that the mean value settles within a predetermined range, and then turns on the tracking servo.

However, with the conventional arts as described above, the tracking control of the optical pickup over the optical disk is made so that the balance position of tracking error signal is aligned in a precise center of a pit on the track of the optical disk. Therefore, when a pit on the track of the optical disk is asymmetrical with respect to the center, there occurs a problem that a reproducing signal from the optical disk is degraded in precision, if the tracking control is made by aligning the balance position of tracking error signal in the center.

That is, with those conventional arts, there occurs a problem that a precision of the reproducing signal is difficult to enhance, when the pit on the track of the optical disk is asymmetrical with respect to the center. The reason that the pit on the track of the optical disk is asymmetrical with respect to the center is that the pit is formed asymmetrically with respect to the center in recording due to characteristics or properties of the optical disk recording/reproducing apparatus.

SUMMARY OF THE INVENTION

It is therefore an object of the invention to provide an optical disk recording/reproducing apparatus capable of improving a precision of a reproducing signal for an optical disk in such a manner that a balance position of a tracking error signal is configured at a point at which the error rate is smaller according to the optical disk to be reproduced.

In order to achieve the above object, according to a first aspect of the invention, there is provided an optical disk recording/reproducing apparatus including: an optical pickup adapted to emit a laser beam to record or reproduce information on or from an optical disk, and to output a reproducing signal in accordance with a reflected light received from the optical disk; a first error rate measuring part adapted to measure a first error rate in a state where a balance position of a tracking error signal contained in the reproducing signal is adjusted in the center; a second error rate measuring part adapted to measure a second error rate in a state where the balance position of the tracking error signal is shifted off in a plus direction from the center, when the first error rate is outside a permissible range; a third error rate measuring part adapted to measure a third error rate in a state where the balance position of the tracking error signal is shifted off in a minus direction from the center, when the first error rate is outside the permissible range; an error rate detecting part adapted to detect an error rate that is smaller by comparing the second error rate and the third error rate; a shift amount varying part adapted to vary a shift amount of the balance position of the tracking error signal in the plus direction and in the minus direction; and a controller adapted to control tracking over the optical disk, wherein when the error rate detected by the error rate detecting part indicates an improved error rate over the first error rate, the controller controls the tracking on the basis of a tracking error signal of the improved error rate.

In order to achieve the above object, according to a second aspect of the invention, there is provided an optical disk recording/reproducing apparatus including: an optical pickup adapted to emit a laser beam to record or reproduce information on or from an optical disk, and to output a reproducing signal in accordance with a reflected light received from the optical disk; and a controller adapted to shift a balance position of a tracking error signal contained in the reproducing signal from a center when an error rate is not within a permissible range, and to configure the balance position at a point where the error rate falls within the permissible range and indicates minimum value.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 1:
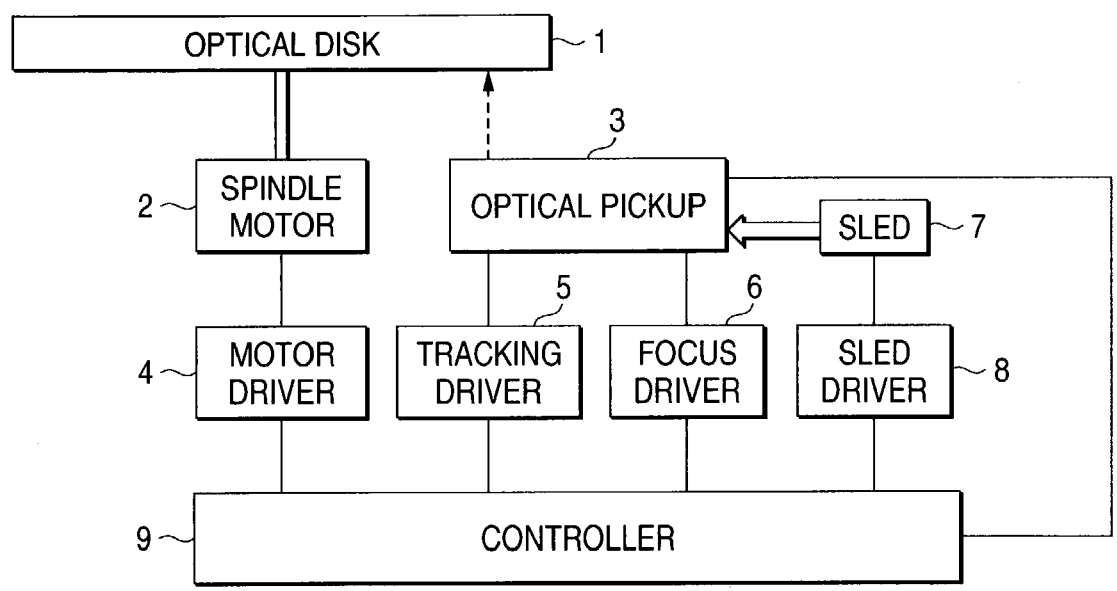
FIG. 1 is a block diagram showing a configuration of a control system for an optical disk recording/reproducing apparatus according to one embodiment of the present invention.

FIG. 1 is a block diagram showing a configuration of a control system for an optical disk recording/reproducing apparatus according to one embodiment of the invention. As shown in FIG. 1, the optical disk recording/reproducing apparatus includes an optical pickup 3 for outputting a laser beam to reproduce and/or record the information from and/or on an optical disk 1, which as a recording medium, and receiving a reflected light from the optical disk 1, a spindle motor 2 for rotating the optical disk 1, a motor driver 4 for driving the spindle motor 2, a tracking driver 5 for driving an actuator for making a tracking servo of the optical pickup 3, a focus driver 6 for driving the actuator for making a focus servo of the optical pickup 3, a sled 7 for moving the optical pickup 3 in a radial direction of the optical disk 1, a sled driver 8 for driving the sled 7, and a controller 9 for controlling the overall control system including drivers for the above components.

Figure 2:
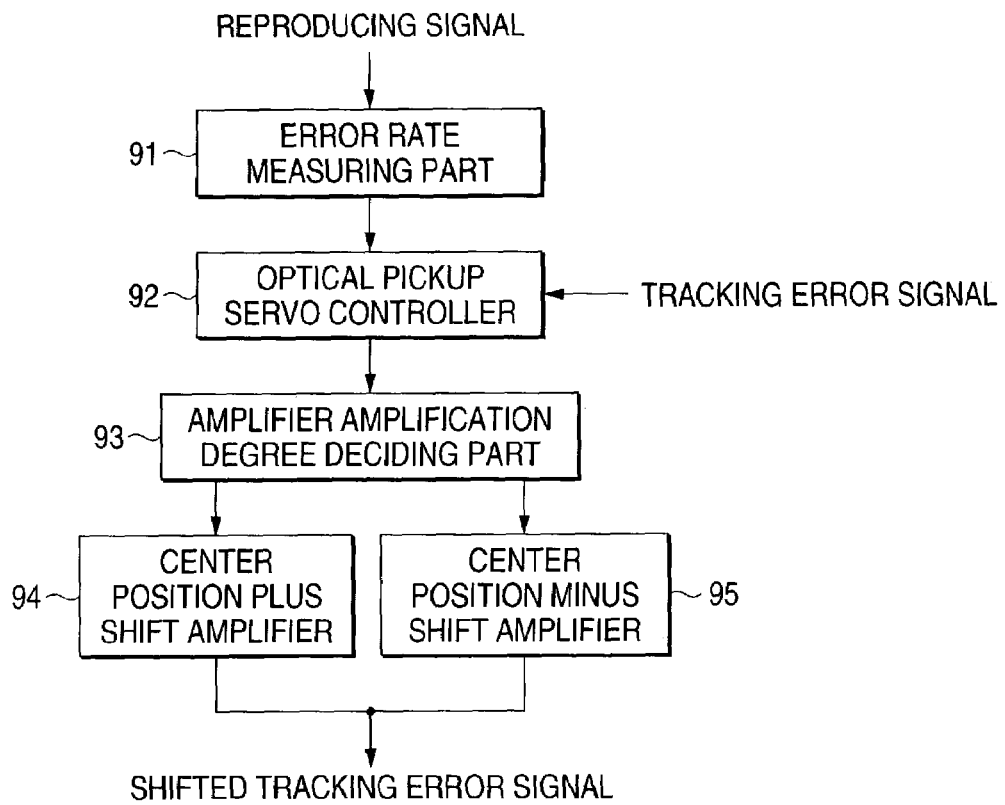
FIG. 2 is a block diagram showing characteristic components in the embodiment among the components of a controller as shown in FIG. 1.

FIG. 2 is a block diagram showing characteristic components in the embodiment among the components of the controller 9. The controller 9 includes an error rate measuring section 91, an optical pickup servo controlling section 92, an amplifier amplification degree deciding section 93, a center position plus shift amplifier 94, and a center position minus shift amplifier 95.

The error rate measuring section 91 of the controller 9 includes a first error rate measuring part adapted to measure a first error rate in a state where a balance position of a tracking error signal detected by the optical pickup 3 is adjusted in the center in reproducing the optical disk, a second error rate measuring part adapted to measure a second error rate in reproducing the optical disk at a position shifted off the balance position of the tracking error signal in a plus direction from the center, if the first error rate is outside a permissible range, a third error rate measuring part adapted to measure a third error rate in reproducing the optical disk at a position shifted off the balance position of the tracking error signal in a minus direction from the center, if the first error rate is outside the permissible range.

The optical pickup servo controlling section 92 includes an error rate detecting part adapted to detect the error rate that is smaller by comparing the second error rate and the third error rate.

The amplifier amplification degree deciding section 93 includes a shift amount varying part for varying a shift amount in the plus or minus direction, in which if it is shifted in the plus direction, the balance position of the tracking error signal is shifted in the plus direction from the center by increasing the amplification degree of the center position plus shift amplifier 94 over that of the center position minus shift amplifier 95, while if it is shifted in the minus direction, the balance position of tracking error signal is shifted in the minus direction from the center by increasing the amplification degree of the center position minus shift amplifier 95 over that of the center position plus shift amplifier 94.

Figure 3:
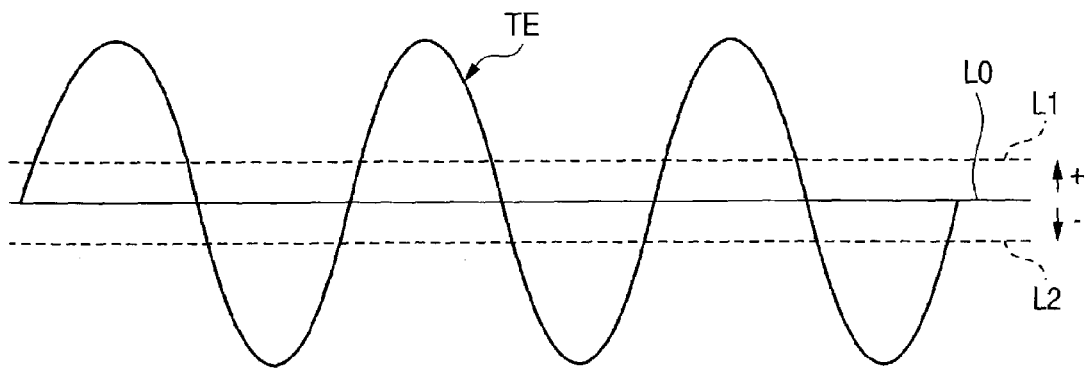
FIG. 3 is a signal waveform chart for explaining how to shift a balance position of a tracking error signal from the center in the embodiment.

FIG. 3 is a signal waveform chart for explaining how to shift the balance position of the tracking error signal from the center in the embodiment. In FIG. 3, TE denotes the tracking error signal, L0 is a line indicating that the balance position of tracking error signal TE in the center, L1 is a line indicating that the balance position is shifted in plus direction, and L2 is the line indicating that the balance position is shifted in minus direction.

Figure 4:
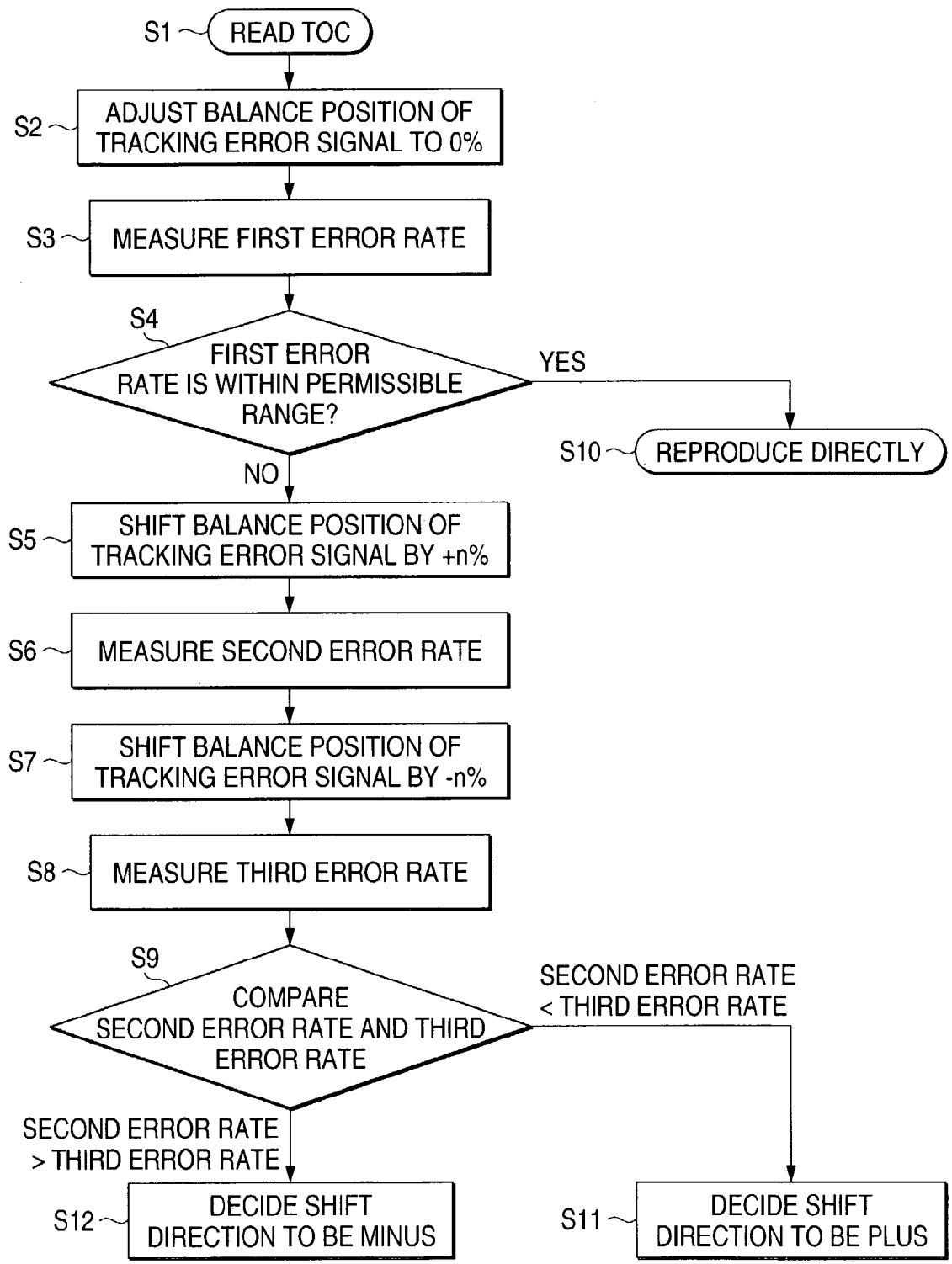
FIG. 4 is a flowchart for explaining a process for deciding a direction of shifting the balance position of the tracking error signal in the controller as shown in FIG. 1.

FIG. 4 is a flowchart for explaining a process for deciding the direction of shifting the balance position of the tracking error signal in the controller 9 of the embodiment. First of all, the optical disk 1 to be reproduced is set on the optical disk recording/reproducing apparatus. When the reproduction is started, TOC (table of contents) information on the optical disk 1 is read by the optical pickup 3 (step S1), and the controller 9 receiving the TOC information adjusts the balance position of the tracking error signal contained in the TOC information in the center (0%) (step S2).

The first error rate in reproduction is measured by the first error rate measuring part in a state where the balance position of the tracking error signal is adjusted in the center (step S3). A determination is made whether or not the first error rate is within a permissible range (step S4). If within the permissible range, the optical disk 1 is directly reproduced (step S10), or if not, the balance position of the tracking error signal is shifted +n % from the center (step S5), and the second error rate in reproduction in this state is measured by the second error rate measuring part (step S6).

The balance position of tracking error signal is shifted −n % from the center (step S7), and the third error rate in reproduction in the state is measured by the third error rate measuring part (step S8). Then, the error rate detecting part compares the second error rate and the third error rate and detects the error rate that is smaller (step S9).

When the second error rate is smaller than the third error rate, the direction of shifting the balance position of tracking error signal is determined to be plus (step S11). When the second error rate is larger than the third error rate, the direction of shifting the balance position of tracking error signal is determined to be minus (step S12).

When the pit on the track of the optical disk is symmetrical with respect to the center, it is best that the balance position of the tracking error signal is brought to the center, whereby there is no need of shifting the balance position of tracking error signal. Accordingly, the balance position of tracking error signal needs to be shifted when the pit on the track of optical disk is asymmetrical with respect to the center, in which case the second error rate and the third error rate are not equal.

Figure 5:
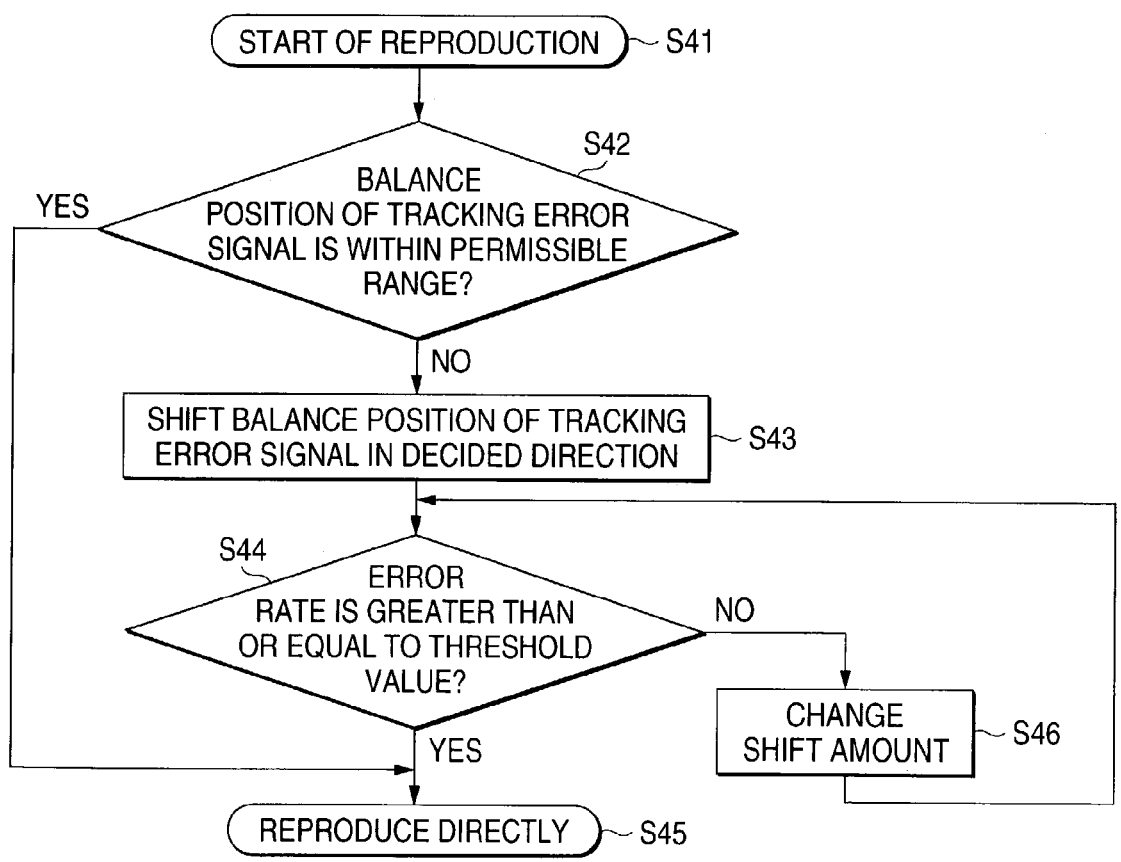
FIG. 5 is a flowchart for explaining a process of tracking servo in the controller as shown in FIG. 1.

FIG. 5 is a flowchart for explaining a process of tracking servo in the controller 9 of the embodiment. As described in the flowchart of FIG. 4, it has been decided in which direction the balance position of the tracking error signal acquired from the TOC information in reproducing the optical disk 1 is shifted from the center.

When the reproduction of the optical disk 1 is started (step S41), a determination is made whether or not the balance position of the tracking error signal contained in a reproducing signal is within a permissible (step S42). If the balance position of tracking error signal is not within the permissible range, the balance position of the tracking error signal is shifted in the decided direction (step S43). For example, if it is decided that the balance position of tracking error signal is shifted 3% in the plus direction, the balance position of tracking error signal is shifted +3% from the center.

The tracking control of the optical disk 1 is made in accordance with the tracking error signal shifted +3% from the center. Then, a determination is made whether or not the error rate for the reproducing signal of the optical disk 1 is greater than or equal to a threshold value (step S44), and if improved, the reproduction is directly continued (step S45).

If the error rate is lower than the threshold value, the shift amount for the balance position of tracking error signal is changed from +3% to +5% by the shift amount varying part of the controller 9 (step S46). And the tracking control of the optical disk 1 is made in accordance with the tracking error signal in which the balance position is shifted +5% from the center. Then, a determination is made whether or not the error rate for the reproducing signal of the optical disk 1 is greater than or equal to the threshold value (step S44), and if improved, the reproduction is directly continued (step S45).

As described above, according to a first aspect of the invention, in reproducing the optical disk, the first error rate is measured by the first error rate measuring part in a state where the balance position of the tracking error signal is adjusted in the center, the second error rate in reproducing the optical disk at a position shifted off the balance position of the tracking error signal in the plus direction from the center is measured by the second error rate measuring part, if the first error rate is outside the permissible range, and the third error rate in reproducing the optical disk at a position shifted off the balance position of the tracking error signal in the minus direction from the center is measured by the third error rate measuring part, if the first error rate is outside the permissible range.

And the smaller error rate is detected by the error rate detecting part by comparing the second error rate and the third error rate, whereby the direction of shifting the balance position of the tracking error signal is decided by the detected smaller error rate. Also, when the error rate detected by the error rate detecting part indicates an improved rate over the first error rate, the tracking control over the optical disk is made on the basis of the tracking error signal corresponding to the improved error rate, whereby the precision of the reproducing signal for the optical disk is enhanced.

For example, when the pit on the track of the optical disk is asymmetrical with respect to the center, the balance position of the tracking error signal is shifted from the center, whereby the tracking control of the optical pickup over the optical disk is made employing the shifted tracking error signal, so that the error rate in reproducing the optical disk is reduced and the precision of the reproducing signal is enhanced.

Also, the shift amount of shifting the balance position of the tracking error signal in the plus or minus direction from the center is varied by the shift amount varying part. Therefore, it can be found that in which direction from the center and by what amount to shift the balance position of the tracking error signal to make the error rate minimum, whereby the shift amount of shifting the balance position of tracking error signal is easily decided.

According to a second aspect of the invention, the balance position of the tracking error signal is shifted from the center, if the error rate is not within a permissible range in reproducing the optical disk, and the balance position of the tracking error signal is configured at a point where the error rate falls within the permissible range to indicate the minimum value. Since the tracking control over the optical disk is made in accordance with the tracking error signal for which the balance position is configured in the above manner, the error rate in reproducing the optical disk is reduced and the precision of reproducing signal is enhanced, even if the pit on the track of the optical disk is asymmetrical with respect to the center.

According to a third aspect of the invention, in addition to the second aspect of the invention, the controller includes: an error rate measuring section adapted to measure the error rate; and an optical pickup servo controlling section adapted to control tracking over the optical disk on the basis of the tracking error signal having such a balance position that the error rate measured by the error rate measuring section is within the permissible range and indicates the minimum value. Therefore, the balance position of the tracking error signal is configured at the point where the error rate is minimum, thereby enhancing the precision of reproducing signal.

According to a fourth aspect of the invention, in addition to the second aspect of the invention, the controller includes a first error rate measuring part adapted to measure a first error rate in a state where a balance position of the tracking error signal is adjusted in the center. Therefore, the error rate is measured in a state where the balance position of tracking error signal is adjusted in the center.

The controller, in addition to the fourth aspect of the invention, includes: a second error rate measuring part adapted to measure a second error rate in a state where the balance position of the tracking error signal is shifted off in a plus direction from the center, when the first error rate is outside a permissible range; and a third error rate measuring part adapted to measure a third error rate in a state where the balance position of the tracking error signal is shifted off in a minus direction from the center, when the first error rate is outside the permissible range. Therefore, the error rate in. reproducing the optical disk at a position shifted off the balance position of tracking error signal in the plus direction from the center and the error rate in reproducing the optical disk at a position shifted off the balance position of tracking error signal in the minus direction from the center can be measured.

The controller, in addition to the fourth aspect of the invention, includes an error rate detecting part adapted to detect an error rate that is smaller by comparing the second error rate and the third error rate, and when the error rate detected by the error rate detecting part indicates an improved error rate over the first error rate, the controller controls the tracking on the basis of a tracking error signal of the improved error rate. Therefore, the precision of the reproducing signal for the optical disk is enhanced.

According to a fifth aspect of the invention, in addition to the fourth aspect of the invention, the controller further includes a shift amount varying part adapted to vary a shift amount of the balance position of the tracking error signal in the plus direction and in the minus direction. Therefore, the shift amount of shifting the balance position of the tracking error signal in the plus or minus direction is varied. Accordingly, it can be found that in which direction from the center and by what amount to shift the balance position of the tracking error signal to make the error rate minimum, whereby the shift amount of shifting the balance position of tracking error signal is easily decided.

According to a sixth aspect of the invention, in addition to the fourth aspect of the invention, the controller further includes a shift amount varying part adapted to vary a shift amount of the balance position of the tracking error signal in the plus direction and in the minus direction, and the controller shifts a balance position of the tracking error signal from a center when the error rate is not within the permissible range, and configures the balance position at a point where the error rate falls within the permissible range and indicates minimum value. The tracking control of the optical pickup over the optical disk is made employing the tracking error signal for which the balance position is configured in the above manner, whereby the precision of the reproducing signal for the optical disk is enhanced.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical disk recording/reproducing apparatus comprising:

an optical pickup adapted to emit a laser beam to record or reproduce information on or from an optical disk, and to output a reproducing signal in accordance with a reflected light received from the optical disk;

a first error rate measuring part adapted to measure a first error rate in a state where a balance position of a tracking error signal contained in the reproducing signal is adjusted in the center;

a second error rate measuring part adapted to measure a second error rate in a state where the balance position of the tracking error signal is shifted off in a plus direction from the center, when the first error rate is outside a permissible range;

a third error rate measuring part adapted to measure a third error rate in a state where the balance position of the tracking error signal is shifted off in a minus direction from the center, when the first error rate is outside the permissible range;

an error rate detecting part adapted to detect an error rate that is smaller by comparing the second error rate and the third error rate;

a shift amount varying part adapted to vary a shift amount of the balance position of the tracking error signal in the plus direction and in the minus direction; and a controller adapted to control tracking over the optical disk, wherein when the error rate detected by the error rate detecting part indicates an improved error rate over the first error rate, the controller controls the tracking on the basis of a tracking error signal having a balance position shifted so as to correspond to the improved error rate.

2. An optical disk recording/reproducing apparatus comprising:

an optical pickup adapted to emit a laser beam to record or reproduce information on or from an optical disk, and to output a reproducing signal in accordance with a reflected light received from the optical disk; and a controller adapted to shift a balance position of a tracking error signal contained in the reproducing signal from a center when an error rate is not within a permissible range, and to configure the balance position at a point where the error rate falls within the permissible range and indicates minimum value, wherein the controller comprises:

a first error rate measuring part adapted to measure a first error rate in a state where a balance position of the tracking error signal is adjusted in the center;

a second error rate measuring part adapted to measure a second error rate in a state where the balance position of the tracking error signal is shifted off in a plus direction from the center, when the first error rate is outside a permissible range;

a third error rate measuring part adapted to measure a third error rate in a state where the balance position of the tracking error signal is shifted off in a minus direction from the center, when the first error rate is outside the permissible range; and an error rate detecting part adapted to detect an error rate that is smaller by comparing the second error rate and the third error rate, wherein when the error rate detected by the error rate detecting part indicates an improved error rate over the first error rate, the controller controls the tracking on the basis of a tracking error signal having a balance position shifted so as to correspond to the improved error rate.

3. The apparatus as claimed in claim 2, wherein the controller further comprises a shift amount varying part adapted to vary a shift amount of the balance position of the tracking error signal in the plus direction and in the minus direction.

4. The apparatus as claimed in claim 2, wherein the controller further comprises a shift amount varying part adapted to vary a shift amount of the balance position of the tracking error signal in the plus direction and in the minus direction, wherein the controller shifts a balance position of the tracking error signal from a center when the error rate is not within the permissible range, and configures the balance position at a point where the error rate falls within the permissible range and indicates minimum value.

* * * * *